July 10, 1928.

J. F. JOHNSON 1,677,093

EQUALIZING MEANS FOR MULTIPLE COLLAR BEARINGS

Filed Sept. 16, 1921

J. F. Johnson
INVENTOR

BY  D C Davis
ATTORNEY

Patented July 10, 1928.

1,677,093

UNITED STATES PATENT OFFICE.

JOSIAH F. JOHNSON, OF SWARTHMORE, PENNSYLVANIA, ASSIGNOR TO WESTINGHOUSE ELECTRIC AND MANUFACTURING COMPANY, A CORPORATION OF PENNSYLVANIA.

EQUALIZING MEANS FOR MULTIPLE-COLLAR BEARINGS.

Application filed September 16, 1921. Serial No. 501,044.

My invention relates to thrust bearing organizations for sustaining heavy thrust loads, particularly of the type employing a plurality of thrust bearings in tandem relation, and has for its object to provide apparatus of the character designated in which the thrust load shall be equalized or distributed in any desired ratio on the respective bearings.

Features of my invention are illustrated on the accompanying drawings, forming a part of this application, in which Fig. 1 is a view partially in section, showing my improved form of bearing;

My invention has for its object to provide apparatus which shall be capable of sustaining heavy thrust loads particularly at relatively high speeds. Apparatus of this character is particularly useful in connection with steam turbines, especially those of the reaction type which develop thrust due to impact as well as pressure differences across the rows of blading. This thrust heretofore has been balanced by using dummy rings or balancing pistons or the latter with a thrust bearing. A dummy ring or balancing piston is costly to make and consumes steam in operation. Accordingly, it is the detailed object of my invention to provide an organization of thrust bearings in which each bearing element is sustained by pressure-distributing mechanism so that the organization is rendered capable of sustaining heavy thrust loads and consequently making it possible to avoid using balancing pistons or dummies.

Turning now to the drawings for a more detailed description of my invention, I show two relatively rotatable members 10 and 11 between which is interposed my improved form of thrust bearing organization. The members 10 and 11 may be the rotor shaft and casing elements respectively of a steam turbine.

Figure 1:
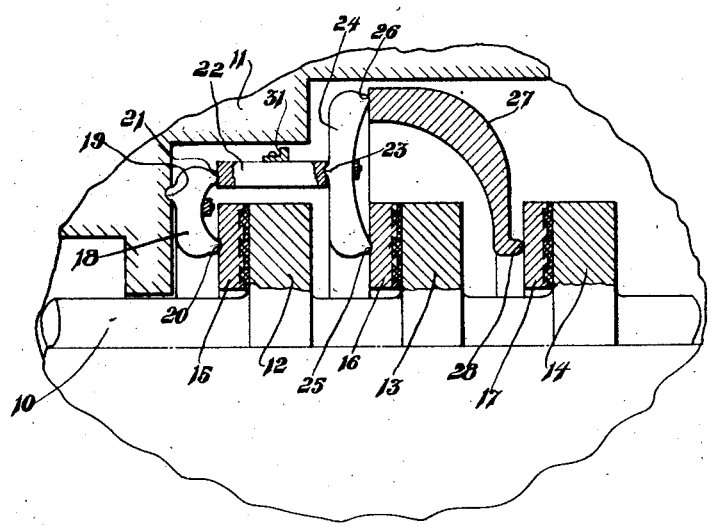

In Figure 1, I show a plurality of thrust bearings, for example three, located between the shaft 10 and the outer or casing element 11. The thrust bearings comprise collars 12, 13, and 14, carried by the shaft, and thrust shoes 15, 16 and 17, preferably of the tiltable type, cooperate respectively therewith.

A lever mechanism or pressure-distributing device is arranged between the sets of shoes 15, 16, and 17 and the outer element or casing 11 in order to distribute the load on the respective bearings in a predetermined ratio. A series of segmental lever members 18 are fulcrumed at 19 against the outer element or casing 11 and the inner ends thereof have pivotal connections 20 with the shoes 15.

The outer ends of the segmental lever members bear respectively at 21 against the struts 22, the latter in turn resting at 23 against intermediate points of the segmental levers 24, the struts serving to transmit thrust loads from one set of levers to the other.

The inner ends of the segmental levers 24 respectively pivotally engage at 25 with the shoes 16 and the outer ends of the lever members are sustained at 26 against the ring member 27, the latter in turn having the thrust shoes 17 pivotally related thereto at 28. The ring member may be conveniently made in sections and bolted together to aid in assembly.

It will be obvious that the loads might be distributed in any desired ratio with the arrangement of lever mechanism shown in Figure 1. As shown, the total load is substantially equally divided between the three thrust bearings.

Figure 4:
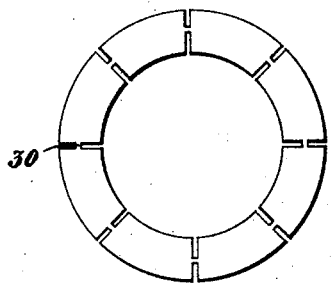
Fig. 4 shows a modified form of segmental lever members.
Figure 3:
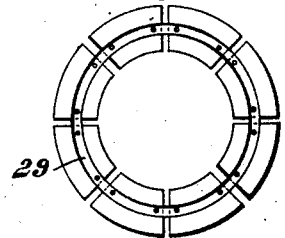
Fig. 3 is a detail view of one form of connected segmental lever members.

The segmental lever members 18 and 24 are adapted to be secured together as units but with capability of the individual segments moving independently. As shown in Fig. 3, an annular flexible strip 29 is used to connect the segmental lever members; and, in Fig. 4, the segmental lever members are connected by integral necks 30.

The strut members 22' are preferably held in assembled relation by means of a flexible connecting member 31 secured thereto in any suitable manner.

Figure 2:
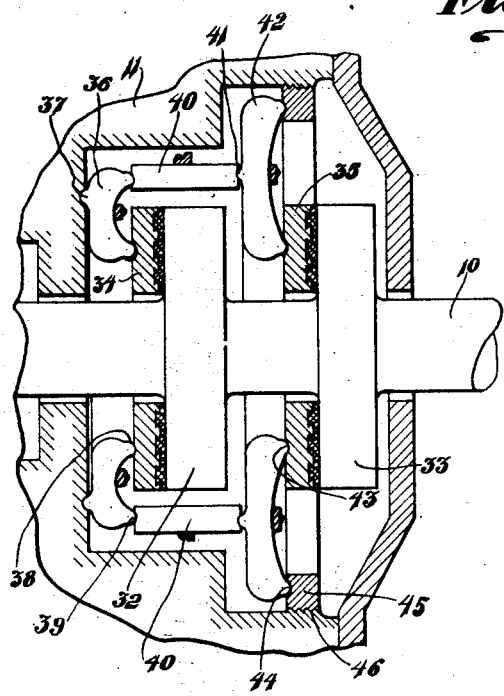
Fig. 2 is a sectional view showing a modified form of bearing.

In Fig. 2, I show a modified form of my invention particularly intended for two bearing elements. In this view, the shaft 10 has connected thereto the thrust collars 32 and 33 with which cooperate thrust shoes 34 and 35, respectively.

A load distributing device is interposed between the thrust shoes 34 and 35 and the outer or casing element 11 in order to equalize or distribute the load between the respective bearings in any predetermined ratio. This mechanism comprises segmental levers 36 fulcrumed at 37 against the outer casing or element 11 and having pivotal connections 38 at their inner ends with the thrust shoes 34. The outer ends of the levers 36 bear at 39 against the struts 40, the latter in turn bearing at 41 at intermediate points respectively along the segmental levers 42.

The inner ends of the segmental levers 42 are pivotally connected at 43 with the shoes 35. The outer ends of levers 42 rest at 44 against the ring 45 having threaded engagement with the outer casing element at 46.

In Fig. 2, each lever has a fixed fulcrum and the strut members serve to transmit thrust from one lever to the other so as to equalize or distribute the load in any desired manner between the bearings.

From the foregoing, the operation of my invention will be obvious. In Fig. 1, the thrust load may be distributed among the three thrust bearings in any desired ratio, dependent upon the location of the fulcrum 19 and the moment arms of the respective shoes. If the fulcrum point 19 is arranged, from the point 21, one-third of the distance between the pivotal points 20 and 21 and the connection 23 is arranged midway between the pivotal points 25 and 26, it will be obvious that the load will be equally divided between the three bearings. Similarly, in Fig. 2, any desired distribution of load may be effected by a suitable location of the fulcrum point 37 with respect to the ends of a segmental lever member 36 and the location of the point of connection of a strut 40 with a segmental lever 42. For example, the load may be equally distributed between the two thrust bearings if the fulcrum point 37 is arranged, from the point 39, one-third of the distance between the points 39 and 38 and the point of engagement of a strut 40 with a segmental lever 42 is arranged midway of the latter. With the structure shown, like numbers of said segmental shoes in each bearing are necessary since balancing is secured in circumferential groups of shoes consisting of one shoe from each bearing. More particularly, there are like numbers of shoes 15 and 16, lever members 18 and 24, and strut members 22 in Fig. 1 and like members of shoes 34 and 35, lever members 36 and 42, and strut members 40 in Fig. 2. The shoes, lever members and interposed strut members are arranged in circumferential groups, each of which consists of a shoe from each bearing, a lever member for each shoe, and a strut interposed between the lever members.

While I have shown two arrangements of thrust bearing organization, one employing three thrust bearings and the other employing two thrust bearings, it will be obvious to those skilled in the art that any suitable number of thrust bearings might be used, it being only necessary to modify and extend the equalizing lever system to accommodate the number of bearings used.

It will also be obvious to those skilled in the art that any suitable type of thrust bearings may be used in connection with my load-distributing mechanism.

From the foregoing, it will be seen that I have combined a plurality of thrust bearings into a single unit and so arranged that pressure will be at all times distributed uniformly or in any desired ratio between the bearings; and I, therefore, produce an organization which is capable of sustaining very heavy thrusts such as are met with in steam turbine practice. It will also be seen that, I am enabled to eliminate dummy or balancing pistons and consequently effect economies in the use of steam and the cost of construction.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. In a thrust bearing, the combination of a movable member; a stationary member; a plurality of spaced thrust collars on the movable member; a plurality of bearing shoes arranged about and operatively engaging each of the collars; and a plurality of thrust transmitting and equalizing mechanisms distributed about the movable member for equalizing the thrust between the bearing shoes of one of said collars and the bearing shoes of another of said collars; each of said mechanisms operating independently of the others and comprising a lever member pivotally engaging a bearing shoe on one of said collars, a fulcrum support for said lever member carried by the stationary member, a second lever member pivotally engaging at one of its ends a bearing shoe on a second collar, seating means for the other end of the second lever, and a compression strut member interposed between the first lever member and the second lever member.

2. In a thrust bearing, the combination of a movable member; a stationary member; a plurality of spaced thrust collars carried by said movable member; a plurality of bearing shoes arranged about and operatively engaging one of said collars; a set of lever members corresponding in number to the bearing shoes; each lever member of the set having a pivotal engagement with a respective bearing shoe; a fulcrum support on the stationary member for each lever member of the set; a plurality of bearing shoes arranged about and operatively engaging a second of said collars; the bearing shoes about the second collar being the same in number as those about the first collar; a second set of lever members corresponding in number to those of the first set; each lever member of the second set having a pivotal engagement at one of its ends with a respective bearing member of the second collar; seating means pivotally engaging the other end of each lever member of the second set; a plurality of independent compression strut members corresponding in number to the lever members of a single set; each of the strut members having a pivotal engagement at one of its ends with a lever member of the first set and a pivotal engagement at its other end with a lever member of the second set; each of said strut members and its associated lever members being so constructed and arranged as to operate independently of the remaining strut members and lever members for transmitting the thrust from a single bearing shoe on one collar to its respective bearing shoe on another collar.

3. In a thrust bearing, the combination of a movable member; a stationary member; a plurality of spaced thrust collars carried by said movable member; a plurality of bearing shoes arranged about and operatively engaging each of the thrust collars; a set of individual and independent lever members pivotally engaging the respective bearing shoes of one of said collars; fixed fulcrum means carried by the stationary member for each of the lever members; a second set of individual and independent lever members; each lever member of the last-named set having a pivotal engagement at one of its ends with a respective bearing shoe on a second collar; individual and independent strut members disposed between the respective lever members associated with the bearing shoes of the one collar and the respective lever members associated with the bearing shoes of the second collar; seating means comprising a ring member for sustaining the outer end of the lever members of the second set; said ring member being pivotally connected to the bearing shoes of a third collar.

4. The combination with relatively movable members, a plurality of thrust bearings located therebetween, each bearing having a plurality of bearing shoes; of individual lever members for supporting the respective shoes of two of said bearings; fixed fulcrum means carried by one of the relatively movable members for every lever member of one of the bearings; individual and independent strut members between each lever member of the one bearing and the respective lever member of the second bearing; each lever member of the second bearing having a pivotal engagement at one of its ends with its respective bearing shoe; and a ring member for sustaining the outer ends of the last-named lever members and pivotally connected to the bearing shoes of a third bearing.

In testimony whereof, I have hereunto subscribed my name this 17th day of August, 1921.

JOSIAH F. JOHNSON.